Patented Oct. 28, 1947

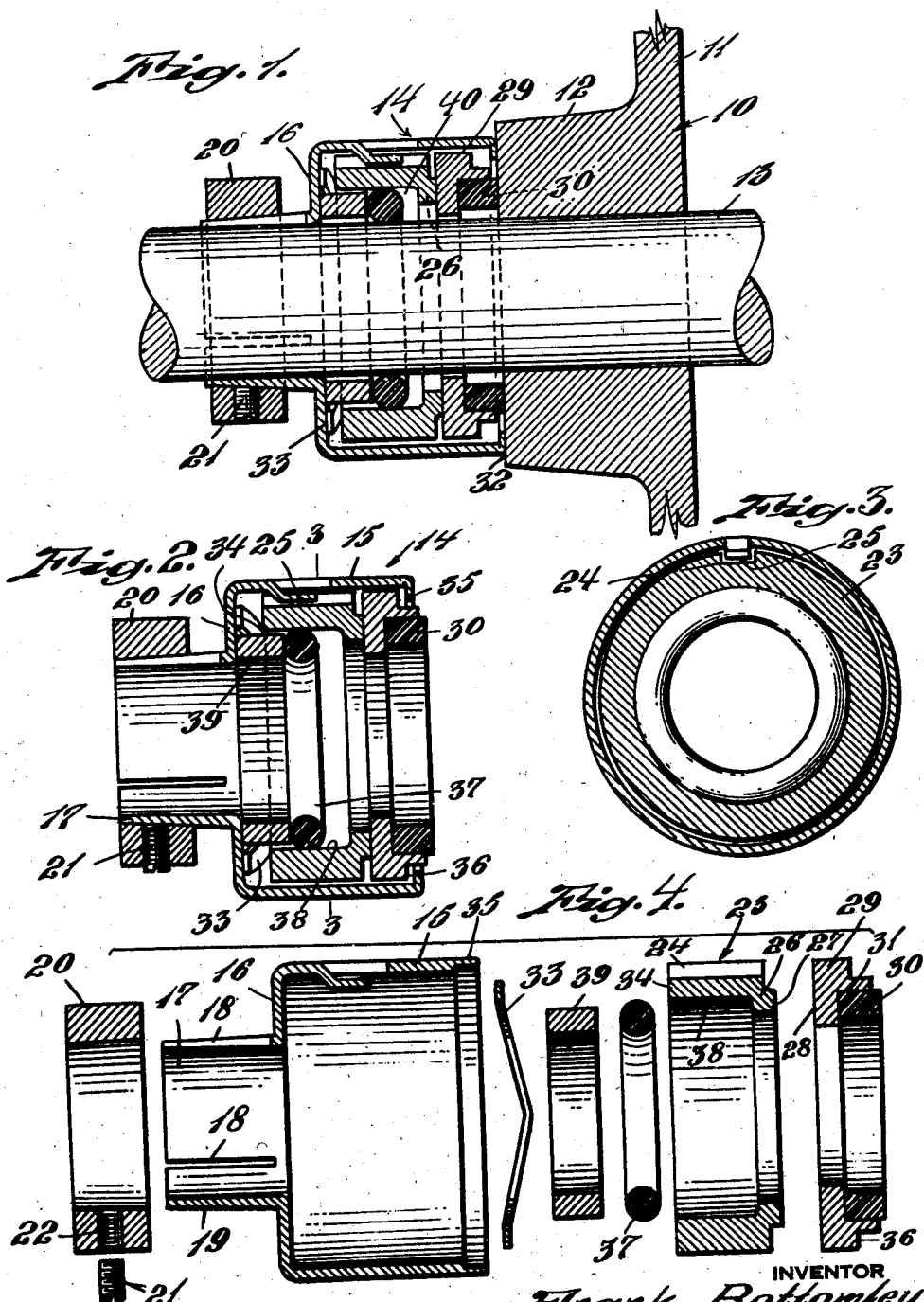

2,429,953

UNITED STATES PATENT OFFICE 2,429,953

SHAFT SEAL ASSEMBLY

Frank Bottomley, Barrington, R. I., assignor to Sealol Corporation, a corporation of Rhode Island Application November 28, 1945, Serial No. 631,255

4 Claims. (Cl. 286—7)

This invention relates to a rotary seal to prevent the escape of liquid from about a rotary shaft which extends through a casing.

In the use of seals for a rotary shaft where it extends through a casing, it is usual that some part of the seal must match up rather accurately with the casing while some other part of the seal must match up rather accurately with the shaft which extends through the casing. This usually requires some machining to be done upon the casing in order to accomplish the desired cooperative relation for the seal.

One of the objects of this invention is to provide a complete seal assembly which may be placed against an unchanged wall of a casing through which a shaft extends and provide a seal against the escape of liquid along the shaft from the casing without machining the casing.

Another object of this invention is to provide a complete seal assembly which may be easily secured to the shaft to rotate therewith while parts within the assembly will abut against the casing to form a tight fit therewith and stay stationary with the casing while the seal occurs within the assembly.

Another object of this invention is to provide a seal where there may be considerable misalignment by the shaft and the end surface of the wall of a casing about the shaft without changing this misalignment.

Another object of this invention is to provide a seal which will take the place of a stuffing box about a shaft as it extends from a casing.

With these and other objects in view, the invention consists of certain novel features of construction as will be more fully described and particularly pointed out in the appended claims.

In the accompanying drawings:

Fig. 1 is a sectional view showing a fragmental portion of the casing and a fragmental portion of a shaft with my seal assembled in sealing relation with reference to the two;

Fig. 2 is a center section of the assembly prior to positioning on the shaft and against the casing;

Fig. 3 is a section on line 3—3 of Fig. 2;

Fig. 4 is an exploded view of the various parts of the assembly in separated relation.

In proceeding with this invention, I provide a shell which will contain all of the various parts of the assembly with the exception of a collar utilized for securing the shell in place on a rotatable shaft. This shell is designed for securing to the rotatable shaft and has within it a sleeve for rotation with the shell and a soft packing to block the entrance of liquid to one end of the sleeve. A facing plate is provided with a ground sealing surface to have a rotary contact with a similar ground surface on the sleeve and this ring or facing plate is equipped with a soft packing to engage the casing and by reason of pressure acting through the sleeve and the ring has its soft packing forced against the casing with sufficient pressure so as to provide a liquid tight fit therewith while the sleeve rotates with reference to the ring. The ring and the sleeve are axially movable in the shell to take up variations of distance and provide an operating sealing unit.

With reference to the drawings, 10 designates a fragmental portion of the casing, having a wall 11 and boss 12. A shaft 13 is rotatable with reference to the casing and extends through the wall 11 and its boss 12. A liquid may move along the surface of this shaft to escape from the casing and it is the purpose of the seal assembly which I provide and designate generally 14 to prevent leakage of this liquid from within the casing along the shaft.

This seal assembly 14 comprises a complete unit as shown in Fig. 2 and comprises a shell 15 (see Fig. 4 also) having an inwardly extending wall 16 with a neck 17 split as at 18 so as to be somewhat expandible and having a tapered outer surface 19. This neck will slide freely along the shaft 13 and may be clamped in place at any position along the shaft. A collar 20 may be slidable along the tapered surface 19 so as to force the split portions 17 inwardly to tightly grip the shaft 13. Additional securing may be by reason of one or more set screws 21 extending through the threaded opening 22 in this solid collar.

Within this shell 15 I provide a sleeve 23 which is axially slidable in the shell 15 and is keyed thereto against rotation by reason of a slot 24 in the outer surface of the sleeve and the key 25 extending into the slot 24. This sleeve is reduced in diameter as at 26 and provided with a sealing face 27.

The sealing face 27 engages the sealing surface 28 of the ring 29 which is also axially movable in the shell 15. Within this ring there is provided a soft facing 30 of rubber or neoprene or some similar resilient substance which will tightly engage the recess 31 in one face of this ring 29 and this may be bonded at this point where high pressure work is to be encountered by this seal. This ring by reason of the much greater friction which is provided by the resilient facing 30 will engage and be held firmly with the end surface 32 of the boss 12 of the casing wall so as to remain fixed with this wall as the shaft, seal and sleeve rotate, thus providing a rotary contact at the seal between the faces 27 and 28.

A spring 33 engages the end 34 of the sleeve 23 and also engages the end wall 16 of the shell. This spring thus working between these two parts forces the sleeve axially to the right as shown in Fig. 2 and likewise forces the ring 29 to the right as shown in Fig. 2. These parts are all held against separation from the shell by reason of the lip 35 of the shell being turned inwardly as shown in Fig. 2 so as to overlap and extend into the recess 36 in the ring 29 and prevent the escape of these parts from the shell.

In order to seal the sleeve with the shaft and yet provide axial movement of the sleeve with reference to the shaft, I provide a soft packing 37 which is round in cross section and which tightly fits between the inner surface 38 of the sleeve and the shaft to prevent access of the fluid to the end 34 of the sleeve. In order to space this packing from the end wall 16 of the shell a spacing or abutment member 39 is provided.

In use, the soft packing 30 will extend out beyond the end of the shell as shown in Fig. 2. The unit as shown in Fig. 2 will be slid over the end of the shaft 13 and soft packing 30 will press against the end surface 32 of the hub 12. The shell will be forced further to the right so that its end will approach the surface 32 and place the spring 33 under greater tension than exists on this spring when the parts are in the relationship shown in Fig. 2. The solid collar 20 will then be slid onto the split neck 17 of the shell and tapped up so that it will force the resilient portions of this neck inwardly to tightly grip the shaft 13. Set screw 21 may be additionally set up if desired. Liquid which escapes along the surface of the shaft 13 will enter the recess 40 and because of the differential in diameter between the portions 38 and the portions 26 any pressure that exists in this fluid will tend to force the sleeve in a direction to assist the spring 33, thus pushing the sleeve toward sealing between the surfaces 27 and 29 and further forcing the ring 29 and its soft packing 30 into sealing position.

All of the wear which occurs is within the assembly and should replacement be desired it is merely necessary to withdraw the collar 20 from position, remove the entire assembly and replace it with another one. The shaft does not wear as no part engages the shaft of the assembly which does not turn with it.

I claim:

1. A sealing unit for a casing with a rotary shaft extending outwardly therefrom comprising a shell, means to secure the shell to a shaft, a ring for encircling the shaft located within the shell and axially movable with reference to said shaft and shell and provided with a soft face on one side to engage said casing and be forced into fixed sealing engagement therewith and an annular sealing face on the other side of said ring, a sleeve encircling said shaft and located within and keyed to said shell and axially movable with reference to said shell and shaft, said sleeve having a sealing face at one end to engage the sealing face of said ring to provide a rotary seal therewith, and a spring acting between said sleeve and shell to force said sleeve toward said ring and in turn said ring toward such casing and soft packing means rotatable with said shaft and sleeve and preventing the escape of fluid between said shaft and sleeve.

2. A sealing unit as set forth in claim 1 wherein the inner diameter of said soft face is less than the diameter of the smallest diameter of said sealing face of said sleeve.

3. A sealing unit as set forth in claim 1 wherein the inner diameter of said soft face is less than the diameter of the smallest diameter of said sealing face of said sleeve and the surface of the sleeve engaged by said soft packing is of a diameter greater than the smallest diameter of said sealing face.

4. A sealing unit as set forth in claim 1 wherein said means to secure the shell to said shaft comprises a split encircling portion of said casing and solid collar slidable on said split portion.

FRANK BOTTOMLEY.

REFERENCES CITED

The following references are of record in the file of this patent:

UNITED STATES PATENTS

| Number | Name | Date |
| --- | --- | --- |
| 2,279,669 | Friskney | Apr. 14, 1942 |
| 2,328,578 | Payne | Sept. 7, 1943 |
| 2,370,471 | Karlberg | Feb. 27, 1945 |

FOREIGN PATENTS

| Number | Country | Date |
| --- | --- | --- |
| 752,065 | France | 1933 |